US010371032B2

(12) United States Patent
Kasai et al.

(10) Patent No.: US 10,371,032 B2
(45) Date of Patent: Aug. 6, 2019

(54) EXHAUST GAS PURIFIER FOR ENGINE

(71) Applicant: MAZDA MOTOR CORPORATION, Hiroshima (JP)

(72) Inventors: Takashi Kasai, Hiroshima (JP); Kazunori Hirasawa, Aki-gun (JP); Yoshitaka Wada, Hiroshima (JP); Tetsuro Furuta, Hiroshima (JP); Masahiro Naito, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 113 days.

(21) Appl. No.: 15/676,144

(22) Filed: Aug. 14, 2017

(65) Prior Publication Data

US 2018/0080362 A1    Mar. 22, 2018

(30) Foreign Application Priority Data

Sep. 16, 2016    (JP) .................... 2016-181882

(51) Int. Cl.
*F01N 3/20* (2006.01)
*F01N 3/28* (2006.01)
*F01N 13/08* (2010.01)

(52) U.S. Cl.
CPC .......... *F01N 3/2892* (2013.01); *F01N 3/2066* (2013.01); *F01N 13/08* (2013.01); *F01N 2240/20* (2013.01); *F01N 2570/14* (2013.01); *F01N 2610/02* (2013.01); *Y02A 50/2325* (2018.01); *Y02T 10/24* (2013.01)

(58) Field of Classification Search
CPC ...... F01N 3/2066; F01N 3/2892; F01N 13/08; F01N 2240/20; F01N 2610/02
See application file for complete search history.

(56) References Cited

U.S. PATENT DOCUMENTS

| 8,079,211 B2 | 12/2011 | Levin et al. | |
| 2008/0155973 A1 | 7/2008 | Maruyama et al. | |
| 2010/0212292 A1 | 8/2010 | Rusch et al. | |
| 2015/0267596 A1 | 9/2015 | Többen et al. | |
| 2016/0032808 A1* | 2/2016 | Kobe | F01N 3/2066 422/168 |
| 2016/0047288 A1* | 2/2016 | Arrowsmith | B01F 5/0473 60/274 |

FOREIGN PATENT DOCUMENTS

| DE | 10 2010 055 642 A1 | 5/2012 | |
| DE | 102014104224 A1 * | 10/2015 | ............ B01F 5/0473 |
| JP | 2008-151088 A | 7/2008 | |
| JP | 2010-031779 A | 2/2010 | |
| JP | 2010031779 A * | 2/2010 | ............ B01F 5/0268 |
| WO | WO-2012172945 A1 * | 12/2012 | ............ B01F 5/0268 |

* cited by examiner

*Primary Examiner* — Audrey K Bradley
(74) *Attorney, Agent, or Firm* — Studebaker & Brackett PC

(57) ABSTRACT

An exhaust pipe of an engine includes a crank-shaped pipe portion having a first bend and a second bend which guide exhaust gas to a mixer, and a straight pipe portion which is continuous with the second bend. The mixer is arranged in the straight pipe portion. An injector is attached to a portion of the second bend which faces the mixer. The injector has an injection axis which extends in a longitudinal direction of the straight pipe portion so as to point toward the mixer. A guide which guides a part of the exhaust gas from the first bend toward the injector is provided inside the crank-shaped pipe portion.

10 Claims, 5 Drawing Sheets

EXHAUST GAS PURIFIER FOR ENGINE

CROSS-REFERENCE TO RELATED APPLICATION

This application claims priority to Japanese Patent Application No. 2016-181882 filed on Sep. 16, 2016, the entire disclosure of which is incorporated by reference herein.

BACKGROUND

The present disclosure relates to an exhaust gas purifier for an engine.

Exhaust gas from lean-burn engines such as diesel engines and lean burn gasoline engines includes NOx (nitrogen oxide). As catalysts for NOx reduction, for example SCR (selective catalytic reduction) catalysts are known in the art. SCR catalysts use $NH_3$ as reducing agent to reduce NOx included in the exhaust gas. In the case of automobiles, aqueous urea solution is widely used as a precursor of $NH_3$. In general, an injector for the aqueous urea solution, a mixer, and an SCR catalyst are provided in an engine exhaust pipe from upstream to downstream in this order. In this configuration, the aqueous urea solution is injected by the injector, mixed with the exhaust gas by the mixer, and supplied to the SCR catalyst. $NH_3$ is generated due to thermal decomposition or hydrolysis of urea.

An example of such an SCR system is disclosed in German Patent Publication No. 102010055642. In this SCR system, an oxidation catalyst, an injector, a mixer, a hydrolysis catalyst, an SCR catalyst, and another oxidation catalyst are provided in an exhaust pipe of an engine from upstream to downstream in this order. In such an SCR system, when the exhaust gas has a low temperature, urea and its derivatives are at risk of precipitating at a tip of the injector which is exposed inside the exhaust pipe. Precipitation of urea and other materials can lead to malfunctions of the injector. In order to prevent the precipitation of urea and other materials, the above publication attempts to reduce the injection amount, injection frequency, and injection pressure of the aqueous urea solution when the exhaust gas has a low temperature.

In order to increase NOx reduction efficiency in an SCR system, the mixer needs to efficiently mix the aqueous urea solution with the exhaust gas. Therefore, in a conceivable configuration, for example, a crank-shaped pipe portion including a first bend and a second bend which are bent in opposite directions is provided in an exhaust pipe, a mixer is arranged in a straight pipe portion continuous with the second bend, and an injector is attached to an outer side wall of the second bend. That is, by configuring the exhaust pipe in a cranked shape, an injector can be arranged such that an injection axis of the injector extends in a longitudinal direction of the straight pipe portion and points toward the mixer. As a result, the mixer can easily mix the aqueous urea solution with the exhaust gas.

However, if the exhaust pipe has a cranked shape, the exhaust gas is prone to take a short route when flowing from an inner side of the first bend along an inner side of the second bend. Thus, the exhaust gas does not flow well in the vicinity of the outer side wall of the second bend the injector is attached to, which is why the flow of the exhaust gas can easily stagnate. Therefore, heat is hardly transmitted from the exhaust gas to a tip of the injector, and, if the exhaust gas has a low temperature, precipitation of urea and other materials is prone to occur at the tip.

In the above publication, by contrast, the injection amount of the aqueous urea solution is reduced as a measure to prevent the precipitation of urea and other materials. This leads to the concern that NOx reduction performance is sacrificed in favor of precipitation prevention. Alternatively, it is conceivable to provide an insulator or to raise the temperature of the tip of the injector by the help of a heater. Such a solution, however, would increase the device in size and also be a disadvantage in terms of costs.

SUMMARY

While facilitating mixing of the aqueous urea solution with the exhaust gas, the present disclosure keeps urea and other materials from precipitating in the vicinity of the tip of the injector without having to reduce the injection amount of the aqueous urea solution.

In order to solve the above problem, in the present disclosure, a guide which leads a part of the exhaust gas to the tip of the injector is provided inside the exhaust pipe.

The exhaust gas purifier for an engine disclosed herein includes:

an SCR catalyst which is provided in an exhaust pipe of an engine and selectively reduces NOx included in exhaust gas by $NH_3$;

an injector which is provided upstream of the SCR catalyst in the exhaust pipe and injects an aqueous urea solution used for generating $NH_3$ into the exhaust gas; and a mixer which is provided between the injector and the SCR catalyst in the exhaust pipe and promotes mixing of the aqueous urea solution injected by the injector and the exhaust gas.

The exhaust pipe includes a crank-shaped pipe portion having a first bend and a second bend which are bent in opposite directions and guide the exhaust gas to the mixer, and a straight pipe portion continuous with the second bend of the crank-shaped pipe portion. The mixer is arranged in the straight pipe portion.

The injector is attached to a portion of the second bend facing the mixer, and has an injection axis which extends in a longitudinal direction of the straight pipe portion so as to point toward the mixer.

Further, a guide which guides a part of the exhaust gas from the first bend toward the portion of the second bend to which the injector is attached is provided inside the crank-shaped pipe portion.

According to this exhaust gas purifier, by providing the crank-shaped pipe portion in the exhaust pipe, the injection axis of the injector is extended in the longitudinal direction of the straight pipe portion such that the injection axis points toward the mixer. This allows for mixing the aqueous urea solution well with the exhaust gas. As a result, NOx reduction performance is improved.

Despite the crank-shaped pipe portion being provided in the exhaust pipe as described above, a part of the exhaust gas is guided from the first bend to the guide, and flows to the portion of the second bend to which the injector is attached. This increases the amount of exhaust gas passing along the portion to which the injector is attached. Consequently, even if the exhaust gas has a low temperature, the heat of the exhaust gas is efficiently supplied to the vicinity of the tip of the injector, and urea and other materials can be kept from precipitating in the vicinity of the tip. Thus, according to the present disclosure, urea and other materials are not kept from precipitating in the vicinity of the tip of the injector by using a heater or by reducing the injection amount of the aqueous urea solution. Instead, urea and other materials can be conveniently kept from precipitating by making use of the heat of the exhaust gas, which is beneficial in view of costs and NOx reduction performance.

In an embodiment of the present disclosure, the guide has a plate shape and divides an inside of the crank-shaped pipe portion so as to intersect the inside of the crank-shaped pipe portion such that, at a location upstream of the portion to which the injector is attached inside the crank-shaped pipe portion in a flow direction of the exhaust gas, the exhaust gas inside the crank-shaped pipe portion is divided into a flow flowing at a side of the injector and a flow flowing at a side of the mixer, the guide being curved so as to become closer to the portion of the second bend to which the injector is attached in a downstream flow direction of the exhaust gas.

As a result, the guide does not significantly obstruct the flow of the exhaust gas, and can lead a part of the exhaust gas to the injector and, by doing so, efficiently raise the temperature in the vicinity of the tip of the injector. More specifically, since an upstream edge of the guide in the flow direction of the exhaust gas divides the inside of the crank-shaped pipe portion into the side of the injector and the side of the mixer, the exhaust gas is just divided at the upstream edge of the guide into a flow flowing at the side of the injector and a flow flowing at the side of the mixer. Therefore, the guide does not significantly obstruct the flow of the exhaust gas, and thus there is no significant exhaust gas pressure loss. The guide has a curvature which guides a part of the exhaust gas flowing at the side of the injector toward the injector. Thus, the temperature in the vicinity of the tip of the injector can be efficiently raised by the exhaust gas.

In an embodiment of the present disclosure, a groove which is recessed such that a curved portion of the guide has a longer radius of curvature than two side portions of the guide is formed in a width center of the guide which extends in a direction to intersect the inside of the crank-shaped pipe portion. Consequently, while an increase in exhaust gas resistance is limited to the largest possible extend, the exhaust gas which flows at a high velocity near the center portion of the crank-shaped pipe portion and has a high temperature can be efficiently guided by the groove toward the vicinity of the tip of the injector.

In yet another embodiment, the guide divides an inside of the crank-shaped pipe portion such that, at the upstream edge of the guide in the flow direction of the exhaust gas, a passage cross-sectional area at the side of the mixer is larger than a passage cross-sectional area at the side of the injector. This is beneficial inasmuch as the guide does not largely impair the flow of the exhaust gas from the first bend via the second bend toward the mixer, and thus the exhaust gas pressure loss is kept from increasing.

In still another embodiment, a cone-shaped recess which protrudes in a longitudinal direction of the straight pipe portion and is tapered outward is provided at the portion of the second bend to which the injector is attached, and the injector has a tip which is attached to a tip of the cone-shaped recess and which points via the cone-shaped recess toward an inside of the second bend.

In this embodiment, a part of the exhaust gas is guided by the guide to the side of the injector and flows into the cone-shaped recess. This allows for keeping urea and other materials from precipitating in the vicinity of the tip of the injector. On the other hand, since the temperature of the exhaust gas increases during high load operation of the engine, it is necessary to keep the hot exhaust gas from causing heat damage to the injector. The injector is prone to malfunctions when reaching excessively high temperatures. To meet this problem, the injector is attached to the tip of the cone-shaped recess which protrudes outward from the second bend. This keeps the injector from reaching excessively high temperatures due to the hot exhaust gas.

In yet still another embodiment, the crank-shaped pipe portion, the straight pipe portion, the SCR catalyst, and the injector are provided inside a floor tunnel which extends in a longitudinal direction of an automobile, a portion of the crank-shaped pipe portion reaching from the first bend to the second bend extends from one side to an other side of the floor tunnel, the straight pipe portion which is continuous with the second bend extends backwards in a direction inclined with respect to a longitudinal direction of the floor tunnel from the other side of the floor tunnel toward a width center of the floor tunnel, and the SCR catalyst extends in a direction corresponding to the longitudinal direction of the floor tunnel.

If the crank-shaped pipe portion is provided in the exhaust pipe, more space is needed for installation of the exhaust pipe than in the case where the crank-shaped pipe portion is not provided.

In this embodiment, the portion of the crank-shaped pipe portion reaching from the first bend to the second bend extends from the one side toward the other side of the floor tunnel. Consequently, the floor tunnel can be designed lower than in the case where this portion extends vertically inside the floor tunnel. That is, the floor tunnel may be kept from significantly protruding into the cabin of the automobile. This configuration is beneficial inasmuch as it allows for designing a comfortable cabin.

On the other hand, if, after the crank-shaped pipe portion has been provided as described above, the straight pipe portion continuous with the second bend is extended in the longitudinal direction of the floor tunnel along the other side of the floor tunnel, i.e., if the straight pipe portion is extended in the longitudinal direction of the floor tunnel at a location shifted from a width center of the floor tunnel toward the other side, it becomes necessary to make the floor tunnel wider. That is, since the SCR catalyst to which the straight pipe portion is connected has a larger diameter than the straight pipe portion, in order to arrange the SCR catalyst inside the floor tunnel, the floor tunnel needs to be further widened by the difference between the width of the straight pipe portion and the width of the SCR catalyst.

In this embodiment, by contrast, the straight pipe portion extends backwards in a direction inclined with respect to the longitudinal direction of the floor tunnel from the other side of the floor tunnel toward the width center of the floor tunnel. Consequently, since the straight pipe portion can be connected to the SCR catalyst at a location close to the width center of the floor tunnel, there is no need to widen the floor tunnel in order to install the SCR catalyst. As a result, portions of a floor inside an automobile cabin at both sides of the floor tunnel do not have to be designed narrower in width, and thus this configuration is beneficial inasmuch as it allows for maintaining the comfort of the cabin.

Beneficially, a portion of the crank-shaped pipe portion reaching from the first bend to the second bend extends from one side to an other side of the floor tunnel backwards in a direction inclined with respect to a longitudinal direction of the floor tunnel.

In another embodiment, the injection axis of the injector which points toward the mixer and extends in the longitudinal direction of the straight pipe portion does not coincide with a center of the SCR catalyst at an inlet side of the SCR catalyst.

As described above, if, after the straight pipe portion has been extended backwards in a direction inclined with respect to the longitudinal direction of the floor tunnel, the straight pipe portion is connected to the SCR catalyst which extends in a direction corresponding to the longitudinal direction of the floor tunnel, the injection axis of the injector does no longer coincide with a center of an inlet side of the SCR catalyst. Since, however, the mixer is located between the injector and the SCR catalyst, and since the injection axis of the injector points toward the mixer, even in this case the aqueous urea solution can be supplied to the SCR catalyst after having been thoroughly mixed with the exhaust gas by the mixer.

In yet another embodiment, the injector ejects the aqueous urea solution in sprayed form. In order to keep the aqueous urea solution sprayed from hitting the guide, the guide is provided at a location out of a spray angle range of the injector.

Further, another exhaust gas purifier for an engine disclosed herein includes:

an SCR catalyst which is provided in an exhaust pipe of an engine, and selectively reduces NOx included in exhaust gas by $NH_3$;

an injector which is provided upstream of the SCR catalyst in the exhaust pipe and injects an aqueous urea solution into the exhaust gas for generating $NH_3$; and a mixer which is provided between the injector and the SCR catalyst in the exhaust pipe and promotes mixing of the aqueous urea solution injected by the injector and the exhaust gas, wherein the exhaust pipe includes a straight pipe portion in which the mixer is arranged, and an inclined introduction pipe which, in order to introduce the exhaust gas into the mixer, is connected in an inclined manner to the straight pipe portion, the injector is attached to a portion of the inclined introduction pipe facing the mixer, and has an injection axis which extends in a longitudinal direction of the straight pipe portion so as to point toward the mixer, a cone-shaped recess which protrudes in a longitudinal direction of the straight pipe portion and is tapered outward is provided at the portion of the inclined introduction pipe facing the mixer, the injector has a tip which is attached to a tip of the cone-shaped recess and which points via the cone-shaped recess toward an inside of the inclined introduction pipe, and a guide which guides a part of the exhaust gas from the inclined introduction pipe toward the cone-shaped recess is provided inside the inclined introduction pipe.

In this exhaust gas purifier, the inclined introduction pipe is connected to the straight pipe portion in which the mixer is arranged. Therefore, the injector can be provided such that its injection axis extends in the longitudinal direction of the straight pipe so as to point toward the mixer. As a result, the aqueous urea solution is mixed well with the exhaust gas, and NOx reduction performance is improved. Further, since the injector points via the cone-shaped recess protruding outward from the inclined introduction pipe toward the inside of the exhaust pipe, the injector can be kept from reaching an excessively high temperature due to hot exhaust gas during high load operation of the engine.

A part of the exhaust gas is guided from the inclined introduction pipe toward the cone-shaped recess to which the injector is attached. Therefore, even if the exhaust gas has a low temperature, the temperature of the exhaust gas efficiently keeps urea and other materials from precipitating in the vicinity of the tip of the injector.

In yet another embodiment, the guide has a plate shape and divides the inside of the inclined introduction pipe so as to intersect the inside of the inclined introduction pipe such that, at a location upstream of the cone-shaped recess in a flow direction of the exhaust gas in the inclined introduction pipe, the exhaust gas inside the inclined introduction pipe is divided into a flow flowing at a side of the injector and a flow flowing at a side of the mixer, the guide being curved so as to become closer to the cone-shaped recess in a downstream flow direction of the exhaust gas. As a result, the guide does not significantly obstruct the flow of the exhaust gas, and can lead a part of the exhaust gas to the injector and, by doing so, efficiently raise the temperature of the injector.

In still another embodiment, a groove which is recessed such that a curved portion of the guide has a longer radius of curvature than two side portions of the guide is formed in a width center of the guide which extends in a direction to intersect the inside of the inclined introduction pipe. Consequently, while an increase in exhaust gas resistance is limited to the largest possible extend, the exhaust gas which flows at a high velocity near the center portion of the inclined introduction pipe and has a high temperature can be efficiently guided by the groove toward the cone-shaped recess.

In yet still another embodiment, the guide divides the inclined introduction pipe such that, at the upstream edge of the guide in the flow direction of the exhaust gas, a passage cross-sectional area at the side of the mixer is larger than a passage cross-sectional area at the side of the injector. This is beneficial inasmuch as the guide does not largely impair the flow of the exhaust gas from the inclined introduction pipe toward the mixer, and thus the exhaust gas pressure loss is kept from increasing.

In another embodiment, the injector ejects the aqueous urea solution in sprayed form. In order to keep the aqueous urea solution sprayed from hitting the guide, the guide is provided at a location out of a spray angle range of the injector.

DETAILED DESCRIPTION

In the following, embodiments of the present disclosure are described with reference to the drawings. Note that the below embodiments are merely beneficial examples in nature, and are not intended to limit the scope, application, or uses of the present disclosure.

Figure 1:
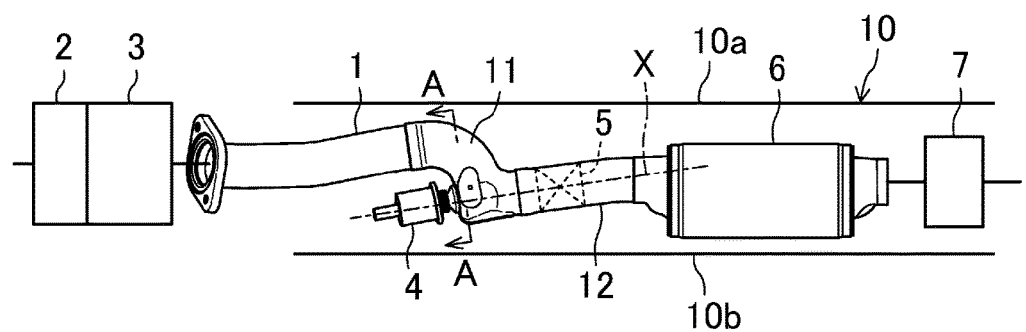
FIG. 1 is a plan view of an exhaust gas purifier according to a first embodiment.

The present embodiment relates to an exhaust gas purifier for an automobile. In FIG. 1, the reference character "1" designates an exhaust pipe of an engine (not shown). In this exhaust pipe 1, an oxidation catalyst 2, a DPF (diesel particulate filter) 3, an injector 4, a mixer 5, an SCR catalyst 6, and an $NH_3$ oxidation catalyst (slip catalyst) 7 are provided from upstream to downstream in this order.

The oxidation catalyst 2 performs oxidation reduction of HC (hydrocarbon) and CO included in exhaust gas. At the same time, the oxidation catalyst 2 serves as a means to raise temperature such that the DPF 3 can be regenerated. Fuel-derived HC is supplied to the oxidation catalyst 2 by, e.g., fuel injection control of the engine performed periodically or when the amount of particulate accumulated on the DPF 3 has exceeded a predetermined value. Catalytic combustion of the HC is performed in the oxidation catalyst 2, and the heat of reaction raises the temperature of the DPF 3. This allows for regenerating the DPF 3.

The injector 4 injects an aqueous urea solution, which is supplied from a tank (not shown) in which the aqueous urea solution is stored, into the exhaust pipe 1. After having been injected into the exhaust pipe 1, the aqueous urea solution is mixed with the exhaust gas by the mixer 5, and supplied to the SCR catalyst 6. In the SCR catalyst 6, $NH_3$ generated by hydrolysis and thermal decomposition of urea is used as a reducing agent to reduce NOx included in the exhaust gas.

The $NH_3$ oxidation catalyst 7 traps and oxidizes $NH_3$ and its derivatives which pass through (slip through) the SCR catalyst 6 without reacting with NOx. By doing so, the $NH_3$ oxidation catalyst 7 reduces the amount of $NH_3$ emitted into the atmosphere.

To allow the mixer 5 to mix the aqueous urea solution well with the exhaust gas, in the exhaust gas purifier of the present embodiment, a crank-shaped pipe portion 11 is provided in the exhaust pipe 1, and the injector 4 is arranged in the crank-shaped pipe portion 11.

The exhaust pipe 1 has a portion reaching from the crank-shaped pipe portion 11 to the SCR catalyst 6. This portion, as well as the injector 4, are provided inside a floor tunnel 10 of the automobile. In FIG. 1, the reference character "10a" designates a bottom edge at one side of the floor tunnel 10, while the reference character "10b" designates a bottom edge at an other side of the floor tunnel 10.

—Crank-Shaped Pipe Portion 11—

Figure 2:
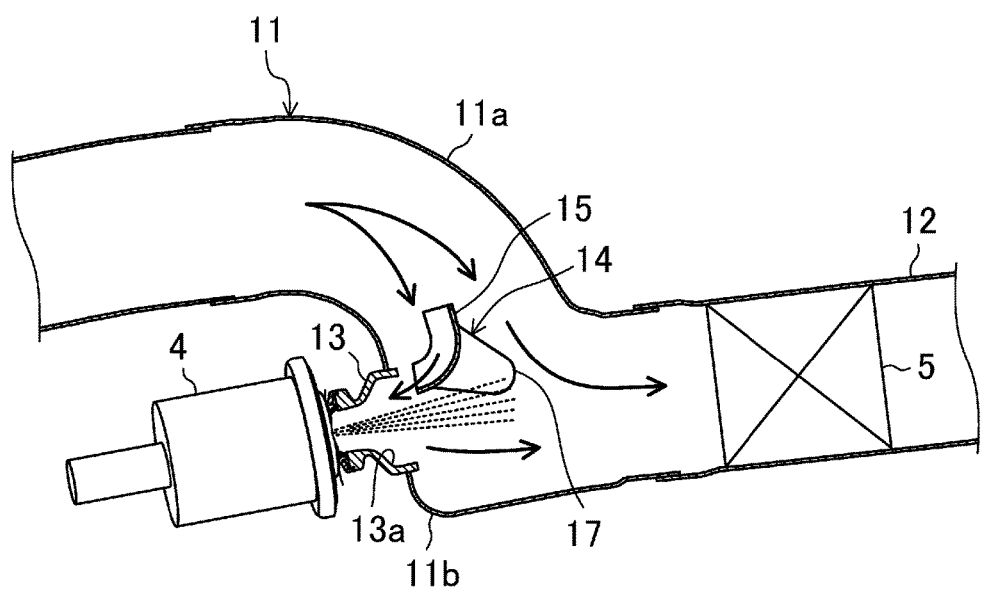
FIG. 2 is a cross-sectional view showing a part of the exhaust gas purifier.
Figure 3:
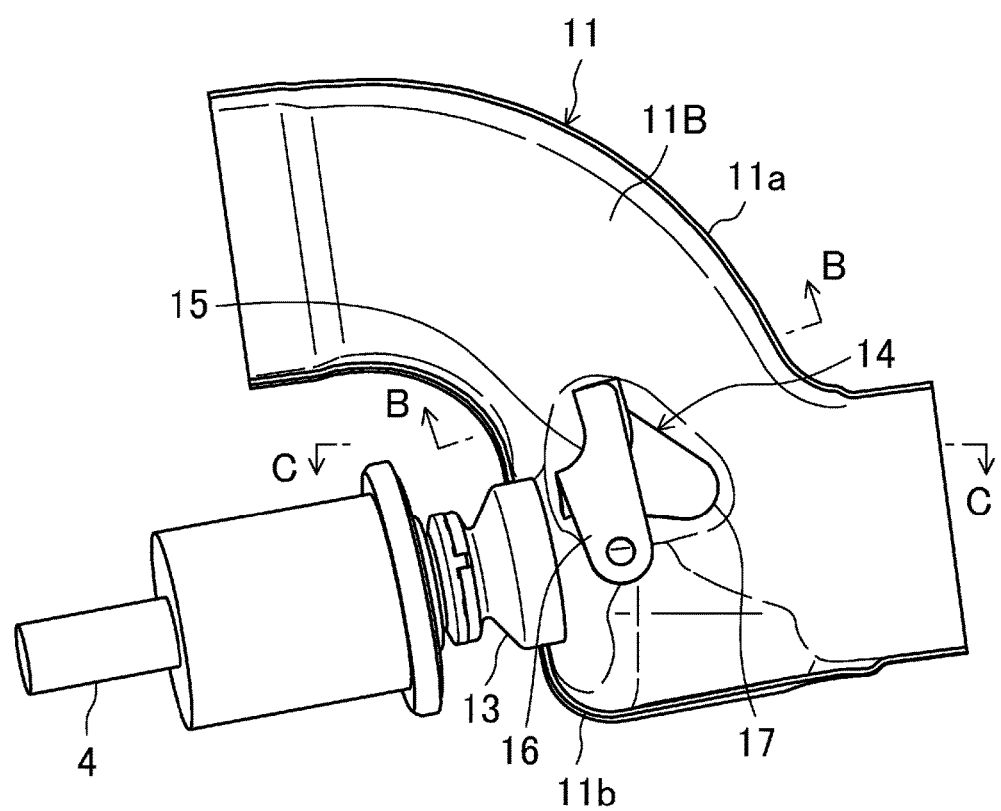
FIG. 3 is a plan view showing a main part of the exhaust gas purifier after having removed an upper semicircular pipe comprising a crank-shaped pipe portion.
Figure 4:
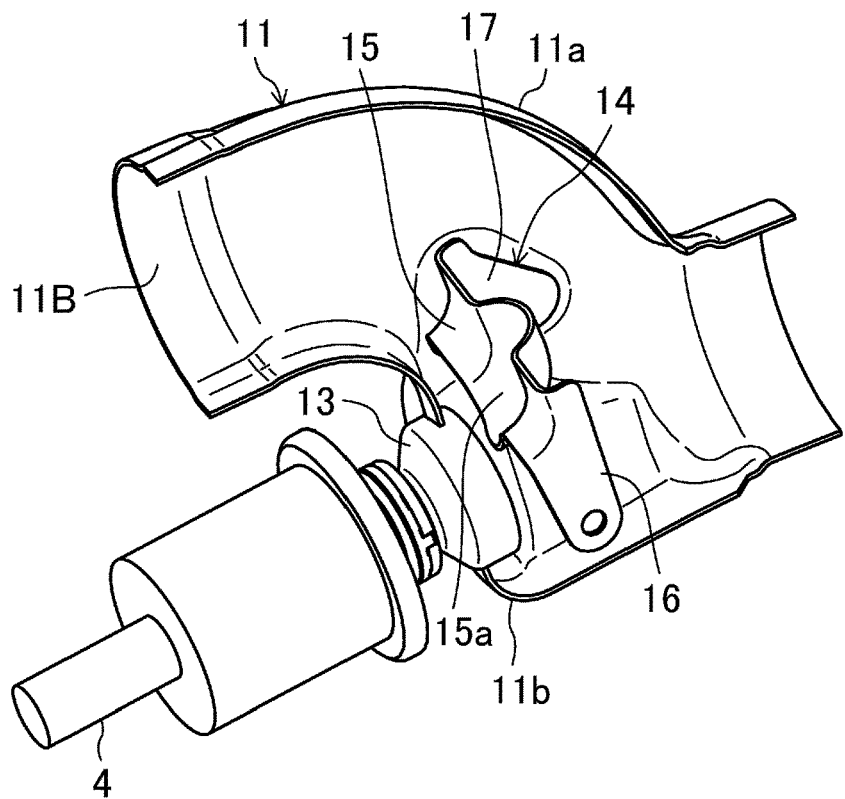
FIG. 4 is a perspective view showing the main part of the exhaust gas purifier after having removed the upper semi-circular pipe comprising the crank-shaped pipe portion.

As shown in FIGS. 2 to 4, the crank-shaped pipe portion 11 includes a first bend 11a and a second bend 11b which are bent in opposite directions and guide the exhaust gas to the mixer 5. The mixer 5 is arranged in a straight pipe portion 12 which is continuous with the second bend 11b of the crank-shaped pipe portion 11 downstream in a flow direction of the exhaust gas. The injector 4 is attached via a cone-shaped element 13 to an outer side wall of the second bend 11b which faces the mixer 5.

As shown in FIG. 1, when viewed in plane, a portion of the crank-shaped pipe portion 11 reaching from the first bend 11a to the second bend 11b extends from one side (indicated by reference character "10a") to an other side (indicated by reference character "10b") of the floor tunnel 10 backwards in a direction inclined with respect to a longitudinal direction of the floor tunnel 10. When viewed in plane, the straight pipe portion 12 which is continuous with the second bend 11b extends backwards in a direction inclined with respect to the longitudinal direction of the floor tunnel 10 from the other side (indicated by reference character "10b") of the floor tunnel 10 toward a width center of the floor tunnel 10. The SCR catalyst 6 extends in a direction corresponding to the longitudinal direction of the floor tunnel 10.

The cone-shaped element 13 protrudes in the longitudinal direction of the straight pipe portion 12 and is tapered outward. The cone-shaped element 13 has a tip coupled with a tip of the injector 4. More specifically, the injector 4 points via a cone-shaped recess 13a formed in an inside of the cone-shaped element 13 toward an inside of the second bend 11b. As shown in FIG. 1, the injector 4 has an injection axis X which extends in the longitudinal direction of the straight pipe portion 12 so as to point toward the vicinity of the center of the mixer 5. In other words, the injection axis X of the injector 4 is substantially concentric with the mixer 5.

As described above, the straight pipe portion 12 extends backwards in a direction inclined with respect to the longitudinal direction of the floor tunnel 10, whereas the SCR catalyst 6 extends in a direction corresponding to the longitudinal direction of the floor tunnel 10. Therefore, the injection axis X of the injector 4 which extends in the longitudinal direction of the straight pipe portion 12 does not coincide with a center of an inlet side of the SCR catalyst 6.

Thus, in order to keep urea and other materials from precipitating in the vicinity of the tip of the injector 4, a guide element 14 is provided in an inside of the crank-shaped pipe portion 11 to guide a part of the exhaust gas from the first bend 11a toward an attachment of the injector 4 in the second bend 11b, i.e., toward the cone-shaped recess 13a.

—Guide Element 14—

Figure 5:
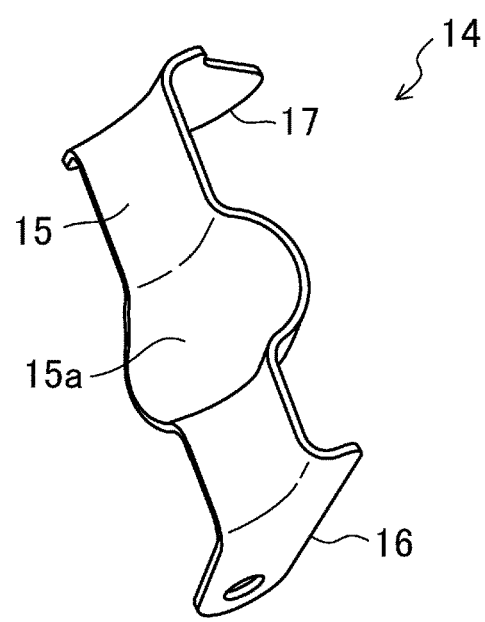
FIG. 5 is a perspective view of a guide element of the exhaust gas purifier.

As shown in FIG. 5, the guide element 14 has a plate shape and includes a guide 15 and attachments 16 and 17. The guide 15 is curved so as to change the flow of a part of the exhaust gas. The attachments 16 and 17 are provided at both sides of the guide 15. In this embodiment, the guide 15 has an arc-shaped cross-section in a direction perpendicular to a direction which connects the attachments 16 and 17 at both sides of the guide 15 with each other. In addition, the guide 15 is provided with a groove 15a. The groove 15a is located in a center portion of the guide 15 between the two attachments 16 and 17, and is recessed such that a curved portion of the guide has a longer radius of curvature than two side portions of the guide 15.

Figure 6:
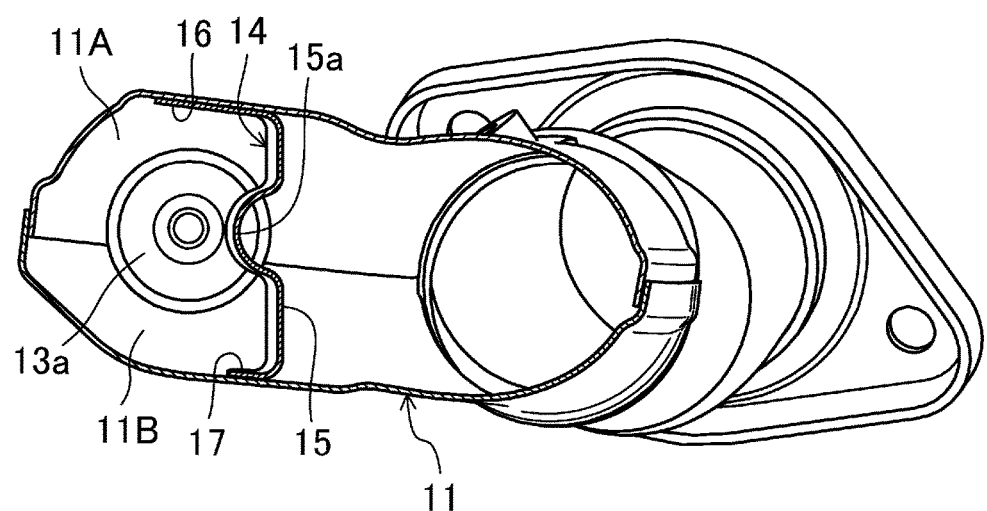
FIG. 6 is a cross-sectional view taken along the line A-A in FIG. 1.
Figure 7:
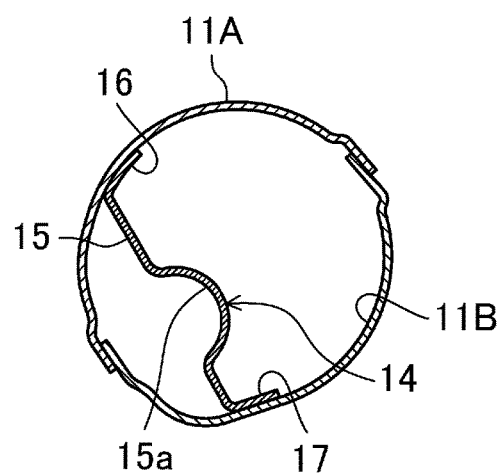
FIG. 7 is a cross-sectional view of a crank-shaped pipe portion and a guide element taken along the line B-B in FIG. 3.
Figure 8:
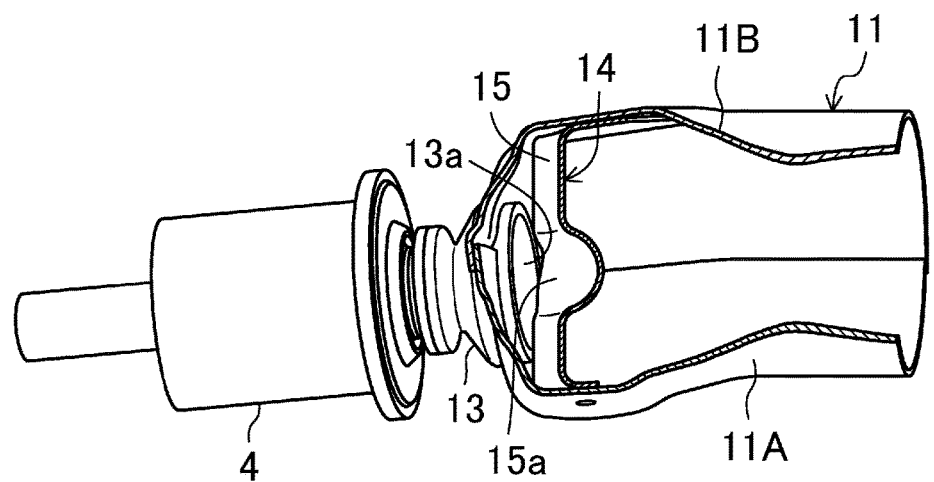
FIG. 8 is a cross-sectional view of main parts of the exhaust gas purifier taken along the line C-C in FIG. 3.

As shown in FIGS. 6 to 8, the crank-shaped pipe portion 11 is formed by combining an upper semicircular pipe 11A and a lower semicircular pipe 11B with each other. As shown in FIGS. 2 to 4, the guide element 14 is arranged so as to extend from the first bend 11a to the second bend 11b of the crank-shaped pipe portion 11. Further, as shown in FIGS. 6 to 8, in the guide element 14, the attachments 16 and 17 at both sides are fixed to portions corresponding to the upper semicircular pipe 11A and the lower semicircular pipe 11B such that the guide 15 intersects the inside of the crank-shaped pipe portion 11. Consequently, the groove 15a with the long radius of curvature is located in a width center of the guide 15 which extends in a direction to intersect the inside of the crank-shaped pipe portion 11.

As a result, the guide 15 divides the inside of the crank-shaped pipe portion 11 at a location upstream of the attachment of the injector 4 in a flow direction of the exhaust gas such that the exhaust gas is divided into a flow toward the injector 4 and a flow toward the mixer 5. Specifically, an upstream portion of the guide 15 in the flow direction of the exhaust gas extends in the flow direction of the exhaust gas so as to divide the inside of the first bend 11a into an inner side and an outer side. The guide 15 is curved such that a downstream portion of the guide 15 in the flow direction of the exhaust gas becomes closer to the attachment of the injector 4. Moreover, as shown in FIG. 7, the guide 15 divides the inside of the crank-shaped pipe portion 11 such that, at an upstream edge of the guide 15 in the flow direction of the exhaust gas, a passage cross-sectional area of the crank-shaped pipe portion 11 at the side of the mixer 5 is larger than the passage cross-sectional area at the side of the injector 4.

As shown in FIG. 2, the injector 4 of the present embodiment ejects the aqueous urea solution in sprayed form. In order to keep the aqueous urea solution sprayed from hitting the guide 15, the guide 15 has a lower edge located at a position out of the spray angle range of the injector 4.

—Advantages of Exhaust Gas Purifier—

The exhaust gas emitted from the engine flows through the oxidation catalyst 2 and the DPF 3 into the crank-shaped pipe portion 11 of the exhaust pipe 1. As indicated by the arrows in FIG. 2, after having flown into the crank-shaped pipe portion 11, in the portion of the crank-shaped pipe portion 11 reaching from the first bend 11a to the second bend 11b the exhaust gas is divided by the guide 15 of the guide element 14 into a flow flowing toward the injector 4 (the inner side of the first bend 11a) and a flow flowing toward the mixer 5 (the outer side of the first bend 11a).

The upstream portion of the guide 15 extends in the flow direction of the exhaust gas. Therefore, when the exhaust gas is divided in the flow flowing toward the injector 4 and the flow flowing toward the mixer 5, the guide 15 does not largely impair the flow. The flow of the exhaust gas flowing toward the mixer 5, i.e., between the outer side wall of the first bend 11a and the guide 15, proceeds along the inner side wall of the second bend 11b and flows into the straight pipe portion 12 and toward the mixer 5.

As shown in FIG. 7, the passage cross-sectional area at the side of the mixer 5 is larger than the passage cross-sectional area at the side of the injector 4, which is why the flow of the exhaust gas flowing toward the mixer 5 is the main flow. Consequently, the guide 15 does not largely impair the flow of the exhaust gas from the first bend 11a via the second bend 11b toward the mixer 5.

As can be seen, since the upstream portion of the guide 15 extends in the flow direction of the exhaust gas, and since the passage cross-sectional area at the side of the mixer 5 is larger than the passage cross-sectional area at the side of the injector 4, exhaust gas pressure loss due to the guide 15 is kept from increasing.

After the exhaust gas has flowed toward the injector 4, i.e., between the inner side wall of the first bend 11a and the guide 15, the flow direction is altered by the curved surface of the guide 15, and the exhaust gas is guided toward the attachment of the injector 4 at the outer side wall of the second bend 11b. As a result, after having flown toward the injector 4, the exhaust gas flows into the cone-shaped recess 13a and against the tip of the injector 4. By this, even if the exhaust gas has a low temperature, the heat of the exhaust gas efficiently raises the temperature in the vicinity of the tip of the injector 4, and urea and other materials can be kept from precipitating in the vicinity of the tip.

As described above, while the passage cross-sectional area at the side of the injector 4 is small, the guide 15 is provided with the groove 15a with the long radius of curvature in the center portion of the guide 15. Consequently, the exhaust gas which flows at a high velocity near the center portion of the crank-shaped pipe portion 11 and has a high temperature can be efficiently guided by the groove 15a toward the vicinity of the tip of the injector 4.

That is, providing the groove 15a allows for effectively keeping urea and other materials from precipitating while keeping the exhaust gas pressure loss from increasing.

Further, since the injector 4 points via the cone-shaped recess 13a protruding outward from the outer side wall of the second bend 11b toward the inside of the exhaust pipe 1, the injector 4 can be kept from reaching an excessively high temperature due to hot exhaust gas during high load operation of the engine.

Thus, since the injection axis of the injector 4 extends in the longitudinal direction of the straight pipe portion 12 so as to point toward the vicinity of the center of the mixer 5, the mixer 5 efficiently mixes the aqueous urea solution injected by the injector 4 with the exhaust gas. Moreover, the lower edge of the guide 15 is located out of the spray angle range of the injector 4 and upstream of the spray angle range. Consequently, the guide 15 does not impair the injection of the aqueous urea solution by the injector 4.

In this embodiment, the portion of the crank-shaped pipe portion 11 reaching from the first bend 11a to the second bend 11b extends from the one side toward the other side of the floor tunnel 10 when viewed in plane. Consequently, the floor tunnel 10 does not have to be designed high, i.e., the floor tunnel 10 is kept from significantly protruding into the cabin of the automobile. This configuration is beneficial inasmuch as it allows for designing a comfortable cabin.

In this embodiment, the straight pipe portion 12 extends backwards in a direction inclined with respect to the longitudinal direction of the floor tunnel 10 from the other side of the floor tunnel 10 toward the width center of the floor tunnel 10. Consequently, there is no need to increase the floor tunnel 10 in width in order to install the SCR catalyst 6. This configuration is beneficial inasmuch as it allows for maintaining the comfort of the cabin.

In this embodiment, the injection axis X of the injector 4 which extends in the longitudinal direction of the straight pipe portion 12 does not coincide with a center of the SCR catalyst 6 at an inlet side of the SCR catalyst 6. However, since the mixer 5 is located between the injector 4 and the SCR catalyst 6, and since the injection axis X of the injector 4 points toward the mixer 5, the aqueous urea solution can be supplied to the SCR catalyst 6 after having been thoroughly mixed with the exhaust gas by the mixer 5.

Other Embodiments

Figure 9:
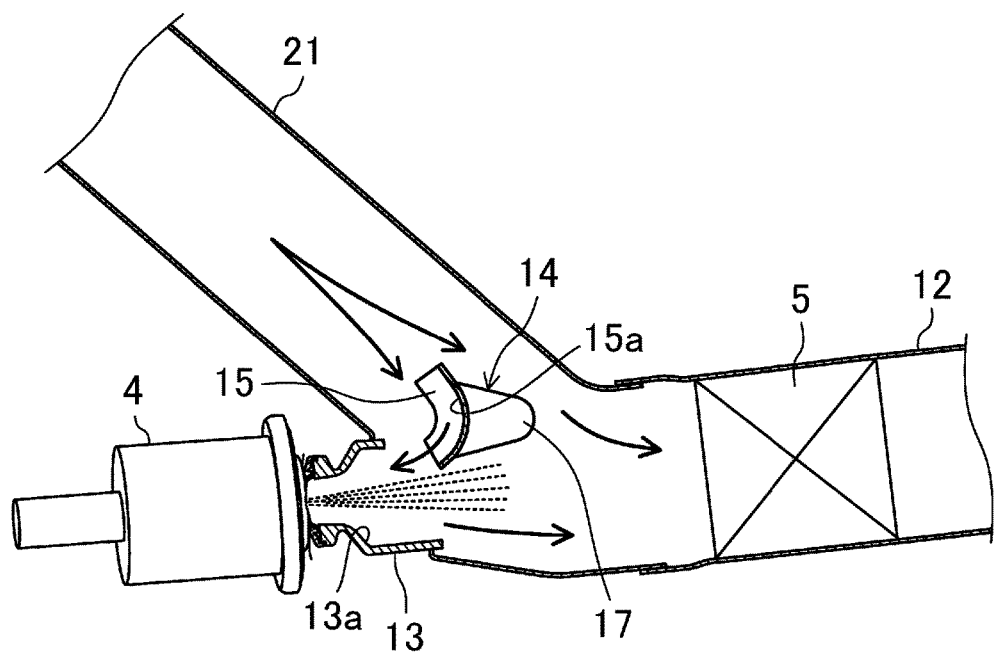
FIG. 9 is a cross-sectional view similar to that of FIG. 2 and shows a part of the exhaust gas purifier according to a second embodiment.

FIG. 9 shows a main part of the exhaust gas purifier for an engine according to another embodiment of the present disclosure. In FIG. 9, elements which are functionally the same as those in the exhaust gas purifier of the previous embodiment are indicated with the same reference characters.

The exhaust pipe 1 of this exhaust gas purifier includes the straight pipe portion 12 in which the mixer 5 is arranged, and an inclined introduction pipe 21 which, in order to introduce exhaust gas into the mixer 5, is connected in an inclined manner to the straight pipe portion 12. Although not shown in the drawings, an oxidation catalyst and a DPF are provided in a portion of the exhaust pipe 1 upstream of the inclined introduction pipe 21, and an SCR catalyst and an $NH_3$ oxidation catalyst are provided in a portion of the exhaust pipe 1 downstream of the straight pipe portion 12.

The injector 4 is attached via the cone-shaped element 13 to a wall of the inclined introduction pipe 21 which faces the mixer 5. More specifically, the tip of the injector 4 is attached to the tip of the cone-shaped element 13, and points via the cone-shaped recess 13a of the cone-shaped element 13 toward an inside of the exhaust pipe 1 where the straight pipe portion 12 and the inclined introduction pipe 21 are connected. The injector 4 has an injection axis which extends in a longitudinal direction of the straight pipe portion 12 so as to point toward the vicinity of the center of the mixer 5.

The guide element 14 is provided inside the inclined introduction pipe 21 to guide a part of the exhaust gas from the inclined introduction pipe 21 toward the cone-shaped recess 13a, i.e., toward the injector 4. Like in the previous embodiment, the guide element 14 includes the guide 15 and attachments. The guide 15 is curved so as to change the flow of part of the exhaust gas to guide the exhaust gas toward the injector 4. The attachments are provided at both sides of the guide 15. FIG. 9 only shows the attachment 17 provided at one side.

The guide 15 has a plate shape and divides the inside of the inclined introduction pipe 21 such that, at a location upstream of the cone-shaped recess 13a in the flow direction of the exhaust gas, the exhaust gas is divided into a flow flowing toward the injector 4 and a flow flowing toward the mixer 5. More specifically, the upstream portion of the guide 15 extends in the flow direction of the exhaust gas in the inclined introduction pipe 21. The upstream portion of the guide 15 divides the inclined introduction pipe 21 such that the passage cross-sectional area at the side of the mixer 5 is larger than the passage cross-sectional area at the side of the injector 4.

The guide 15 is curved so as to become closer to the cone-shaped recess 13a in a downstream flow direction of the exhaust gas. The groove 15a is formed in the width center of the guide 15 such that the curved portion of the guide 15 has a longer radius of curvature than the two side portions of the guide 15.

In the exhaust gas purifier according to the present embodiment, the guide 15 guides a part of the exhaust gas from the inclined introduction pipe 21 toward the cone-shaped recess 13a to which the injector 4 is attached. Therefore, like in the previous embodiment, even if the exhaust gas has a low temperature, the temperature of the exhaust gas efficiently keeps urea and other materials from precipitating in the vicinity of the tip of the injector 4.

Further, like in the previous embodiment, since the upstream portion of the guide 15 extends in the flow direction of the exhaust gas, and since the passage cross-sectional area at the side of the mixer 5 is larger than the passage cross-sectional area at the side of the injector 4, an exhaust gas pressure loss due to the guide 15 is kept from increasing.

As described above, while the passage cross-sectional area at the side of the injector 4 is small, the guide 15 is provided with the groove 15a which has a long radius of curvature in the center portion of the guide 15. Consequently, while an increase in exhaust gas resistance is limited to the largest possible extend, the exhaust gas which flows at a high velocity near the center portion of the inclined introduction pipe 21 and has a high temperature can be efficiently guided by the groove 15a toward the cone-shaped recess 13a.

Since the inclined introduction pipe 21 is connected to the straight pipe portion 12 where the mixer 5 is arranged, the injector can be provided such that the injection axis extends in the longitudinal direction of the straight pipe portion 12 and points toward the vicinity of the center of the mixer 5. Consequently, like in the previous embodiment, the mixer 5 mixes the aqueous urea solution well with the exhaust gas, and NOx reduction performance is improved.

Further, since the injector 4 points via the cone-shaped recess 13a protruding outward from the inclined introduction pipe 21 toward the inside of the exhaust pipe 1, the injector 4 can be kept from reaching an excessively high temperature due to hot exhaust gas during high load operation of the engine.

What is claimed is:

1. An exhaust gas purifier for an engine, the exhaust gas purifier comprising:
    an SCR catalyst which is provided in an exhaust pipe of the engine and selectively reduces NOx included in exhaust gas by NH3;
    an injector which is provided upstream of the SCR catalyst in the exhaust pipe and injects an aqueous urea solution into the exhaust gas for generating NH3; and
    a mixer which is provided between the injector and the SCR catalyst in the exhaust pipe and promotes mixing of the aqueous urea solution injected by the injector and the exhaust gas, wherein
    the exhaust pipe includes a crank-shaped pipe portion having a first bend and a second bend which are bent in opposite directions and guide the exhaust gas to the mixer, and a straight pipe portion continuous with the second bend of the crank-shaped pipe portion,
    the mixer is arranged in the straight pipe portion,
    the injector is attached to a portion of the second bend which faces the mixer, and has an injection axis which extends in a longitudinal direction of the straight pipe portion so as to point toward the mixer,
    a guide which guides a part of the exhaust gas from the first bend toward the portion of the second bend to which the injector is attached is provided inside the crank-shaped pipe portion,
    the guide has a plate shape and divides an inside of the crank-shaped pipe portion so as to intersect the inside of the crank-shaped pipe portion such that, at a location upstream of the portion to which the injector is attached inside the crank-shaped pipe portion in a flow direction of the exhaust gas, the exhaust gas inside the crank-shaped pipe portion is divided into a flow flowing at a side of the injector and a flow flowing at a side of the mixer, the guide being curved so as to become closer to the portion of the second bend to which the injector is attached in a downstream flow direction of the exhaust gas, and
    a groove which is recessed such that a curved portion of the guide has a longer radius of curvature than two side portions of the guide is formed in a width center of the guide which extends in a direction to intersect the inside of the crank-shaped pipe portion.

2. The exhaust gas purifier of claim 1, wherein
    a cone-shaped recess which protrudes in a longitudinal direction of the straight pipe portion and is tapered outward is provided at the portion of the second bend to which the injector is attached, and
    the injector has a tip which is attached to a tip of the cone-shaped recess and which points via the cone-shaped recess toward an inside of the second bend.

3. The exhaust gas purifier of claim 1, wherein
    a cone-shaped recess which protrudes in a longitudinal direction of the straight pipe portion and is tapered outward is provided at the portion of the second bend to which the injector is attached, and
    the injector has a tip which is attached to a tip of the cone-shaped recess and which points via the cone-shaped recess toward an inside of the second bend.

4. The exhaust gas purifier of claim 1, wherein
the injector ejects the aqueous urea solution in sprayed form, and
the guide is provided at a location out of a spray angle range of the injector.

5. The exhaust gas purifier of claim 1, wherein
the guide divides an inside of the crank-shaped pipe portion such that, at an upstream edge of the guide in the flow direction of the exhaust gas, a passage cross-sectional area at the side of the mixer is larger than a passage cross-sectional area at the side of the injector.

6. The exhaust gas purifier of claim 5, wherein
a cone-shaped recess which protrudes in a longitudinal direction of the straight pipe portion and is tapered outward is provided at the portion of the second bend to which the injector is attached, and
the injector has a tip which is attached to a tip of the cone-shaped recess and which points via the cone-shaped recess toward an inside of the second bend.

7. An exhaust gas purifier for an engine, the exhaust gas purifier comprising:
an SCR catalyst which is provided in an exhaust pipe of the engine, and selectively reduces NOx included in exhaust gas by NH3;
an injector which is provided upstream of the SCR catalyst in the exhaust pipe and injects an aqueous urea solution into the exhaust gas for generating NH3; and
a mixer which is provided between the injector and the SCR catalyst in the exhaust pipe and promotes mixing of the aqueous urea solution injected by the injector and the exhaust gas, wherein
the exhaust pipe includes a straight pipe portion in which the mixer is arranged, and an inclined introduction pipe which, in order to introduce the exhaust gas into the mixer, is connected in an inclined manner to the straight pipe portion,
the injector is attached to a portion of the inclined introduction pipe facing the mixer, and has an injection axis which extends in a longitudinal direction of the straight pipe portion so as to point toward the mixer,
a cone-shaped recess which protrudes in the longitudinal direction of the straight pipe portion and is tapered outward is provided at the portion of the inclined introduction pipe facing the mixer,
the injector has a tip which is attached to a tip of the cone-shaped recess and which points via the cone-shaped recess toward an inside of the inclined introduction pipe,
a guide which guides a part of the exhaust gas from the inclined introduction pipe toward the cone-shaped recess is provided inside the inclined introduction pipe,
the guide has a plate shape and divides an inside of the inclined introduction pipe so as to intersect the inside of the inclined introduction pipe such that, at a location upstream of the portion to which the cone-shaped recess is attached inside the inclined introduction pipe in a flow direction of the exhaust gas, the exhaust gas inside the inclined introduction pipe is divided into a flow flowing at a side of the injector and a flow flowing at a side of the mixer, the guide being curved so as to become closer to the cone-shaped recess in a downstream flow direction of the exhaust gas, and
a groove which is recessed such that a curved portion of the guide has a longer radius of curvature than two side portions of the guide is formed in a width center of the guide which extends in a direction to intersect the inside of the inclined introduction pipe.

8. The exhaust gas purifier of claim 7, wherein
the injector ejects the aqueous urea solution in sprayed form, and
the guide is provided at a location out of a spray angle range of the injector.

9. An exhaust gas purifier for an engine, the exhaust gas purifier comprising:
an SCR catalyst which is provided in an exhaust pipe of the engine and selectively reduces NOx included in exhaust gas by NH3;
an injector which is provided upstream of the SCR catalyst in the exhaust pipe and injects an aqueous urea solution into the exhaust gas for generating NH3; and
a mixer which is provided between the injector and the SCR catalyst in the exhaust pipe and promotes mixing of the aqueous urea solution injected by the injector and the exhaust gas, wherein
the exhaust pipe includes a crank-shaped pipe portion having a first bend and a second bend which are bent in opposite directions and guide the exhaust gas to the mixer, and a straight pipe portion continuous with the second bend of the crank-shaped pipe portion,
the mixer is arranged in the straight pipe portion,
the injector is attached to a portion of the second bend which faces the mixer, and has an injection axis which extends in a longitudinal direction of the straight pipe portion so as to point toward the mixer,
a guide which guides a part of the exhaust gas from the first bend toward the portion of the second bend to which the injector is attached is provided inside the crank-shaped pipe portion,
the crank-shaped pipe portion, the straight pipe portion, the SCR catalyst, and the injector are provided inside a floor tunnel which extends in a longitudinal direction of an automobile,
a portion of the crank-shaped pipe portion reaching from the first bend to the second bend extends from one side to an other side of the floor tunnel,
the straight pipe portion which is continuous with the second bend extends backwards in a direction inclined with respect to a longitudinal direction of the floor tunnel from the other side of the floor tunnel toward a width center of the floor tunnel, and
the SCR catalyst extends in a direction corresponding to the longitudinal direction of the floor tunnel.

10. The exhaust gas purifier of claim 9, wherein
the injection axis of the injector which points toward the mixer and extends in the longitudinal direction of the straight pipe portion does not coincide with a center of the SCR catalyst at an inlet side of the SCR catalyst.

* * * * *